US011177715B2

(12) United States Patent
Ogawa et al.

(10) Patent No.: US 11,177,715 B2
(45) Date of Patent: Nov. 16, 2021

(54) MOTOR

(71) Applicant: Nidec Corporation, Kyoto (JP)

(72) Inventors: Hiroshi Ogawa, Kyoto (JP); Yoshiaki Yamashita, Kyoto (JP); Yoshinobu Arao, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 170 days.

(21) Appl. No.: 16/482,279

(22) PCT Filed: Feb. 1, 2018

(86) PCT No.: PCT/JP2018/003372
§ 371 (c)(1),
(2) Date: Jul. 31, 2019

(87) PCT Pub. No.: WO2018/143328
PCT Pub. Date: Aug. 9, 2018

(65) Prior Publication Data
US 2019/0372420 A1    Dec. 5, 2019

(30) Foreign Application Priority Data
Feb. 3, 2017 (JP) .............................. JP2017-019073

(51) Int. Cl.
*H02K 11/33* (2016.01)
*H02K 5/10* (2006.01)
*B62D 5/04* (2006.01)

(52) U.S. Cl.
CPC .............. *H02K 5/10* (2013.01); *H02K 11/33* (2016.01); *B62D 5/0406* (2013.01)

(58) Field of Classification Search
CPC .......... H02K 5/22; H02K 5/225; H02K 11/30; H02K 11/33; H02K 5/10; H02K 2203/03; B62D 5/0406
See application file for complete search history.

(56) References Cited

U.S. PATENT DOCUMENTS

2013/0257232 A1*  10/2013  Tomizawa ............. H02K 11/33
                                                                310/68 R
2016/0134178 A1*   5/2016  Acinas Lope ....... B62D 5/0406
                                                                310/64

(Continued)

FOREIGN PATENT DOCUMENTS

JP        2009-284793 A     12/2009

OTHER PUBLICATIONS

Official Communication issued in International Patent Application No. PCT/JP2018/003372, dated Mar. 13, 2018.

*Primary Examiner* — Quyen P Leung
*Assistant Examiner* — Eric Johnson
(74) *Attorney, Agent, or Firm* — Keating & Bennett

(57) ABSTRACT

A motor includes a motor main body including a rotor rotatable about a central axis extending in an up-down direction, a controller to control rotation of the rotor and disposed on an upper side of the motor main body, and a cover surrounding the controller from an outward diameter direction and an upper side of the controller, the controller including a substrate disposed along a direction orthogonal to the central axis and connected with a coil wire extending from the stator, a press fitting pin electrically connected to the substrate and extending along an up-down direction, and a support fitting and contacting a first contact surface facing the upper side of the motor main body and a second contact surface facing a lower side of the cover.

6 Claims, 8 Drawing Sheets

(56) References Cited

U.S. PATENT DOCUMENTS

| | | | |
|---|---|---|---|
| 2016/0181883 A1* | 6/2016 | Yamasaki | H02K 11/33 |
| | | | 310/68 D |
| 2016/0204670 A1* | 7/2016 | Yamasaki | H02K 5/225 |
| | | | 310/71 |
| 2016/0218583 A1 | 7/2016 | Hayashi | |
| 2016/0218596 A1* | 7/2016 | Hayashi | B62D 5/04 |
| 2017/0305456 A1 | 10/2017 | Iwabuki et al. | |

* cited by examiner inward diameter direction ◄──────► outward diameter direction

MOTOR

CROSS REFERENCE TO RELATED APPLICATIONS

This is the U.S. national stage of PCT Application No. PCT/JP2018/003372, filed on Feb. 1, 2018, and priority under 35 U.S.C. § 119(a) and 35 U.S.C. § 365(b) is claimed from Japanese Application No. 2017-019073, filed Feb. 3, 2017; the entire disclosures of each application are hereby incorporated herein by reference.

FIELD OF THE INVENTION

The present disclosure relates to a motor.

BACKGROUND

In recent years, adoption of a mechanism-integrated type motor integrating a control unit has been progressed. For example, a related art rotary electric machine (motor) includes a control board and a cover that houses the control board and is adhered and fixed to a frame.

SUMMARY

In the related art structure, since a plurality of members are interposed between a motor main body and a cover, there is a problem that a position in the axial direction of the cover is liable to be varied. For this reason, for example, when the cover supports a connection terminal with an external device, there is a problem that the position in the axial direction of the connection terminal is scattered, and the connection with the external device becomes unstable.

According to an aspect of an example embodiment of the present disclosure, a motor includes a motor main body including a rotor rotatable about a central axis extending in an up-down direction, a controller to control rotation of the rotor and disposed on an upper side of the motor main body, and a cover surrounding the controller from an outward diameter direction and an upper side of the controller, the controller including a substrate disposed along a direction perpendicular or substantially perpendicular to the central axis and connected with a coil wire extending from the stator, a press fitting pin electrically connected to the substrate and extending along an up-down direction, and a support fitting and contacting a first contact surface facing the upper side of the motor main body and a second contact surface facing a lower side of the cover.

The above and other elements, features, steps, characteristics and advantages of the present disclosure will become more apparent from the following detailed description of the example embodiments with reference to the attached drawings.

DETAILED DESCRIPTION

Figure 1:
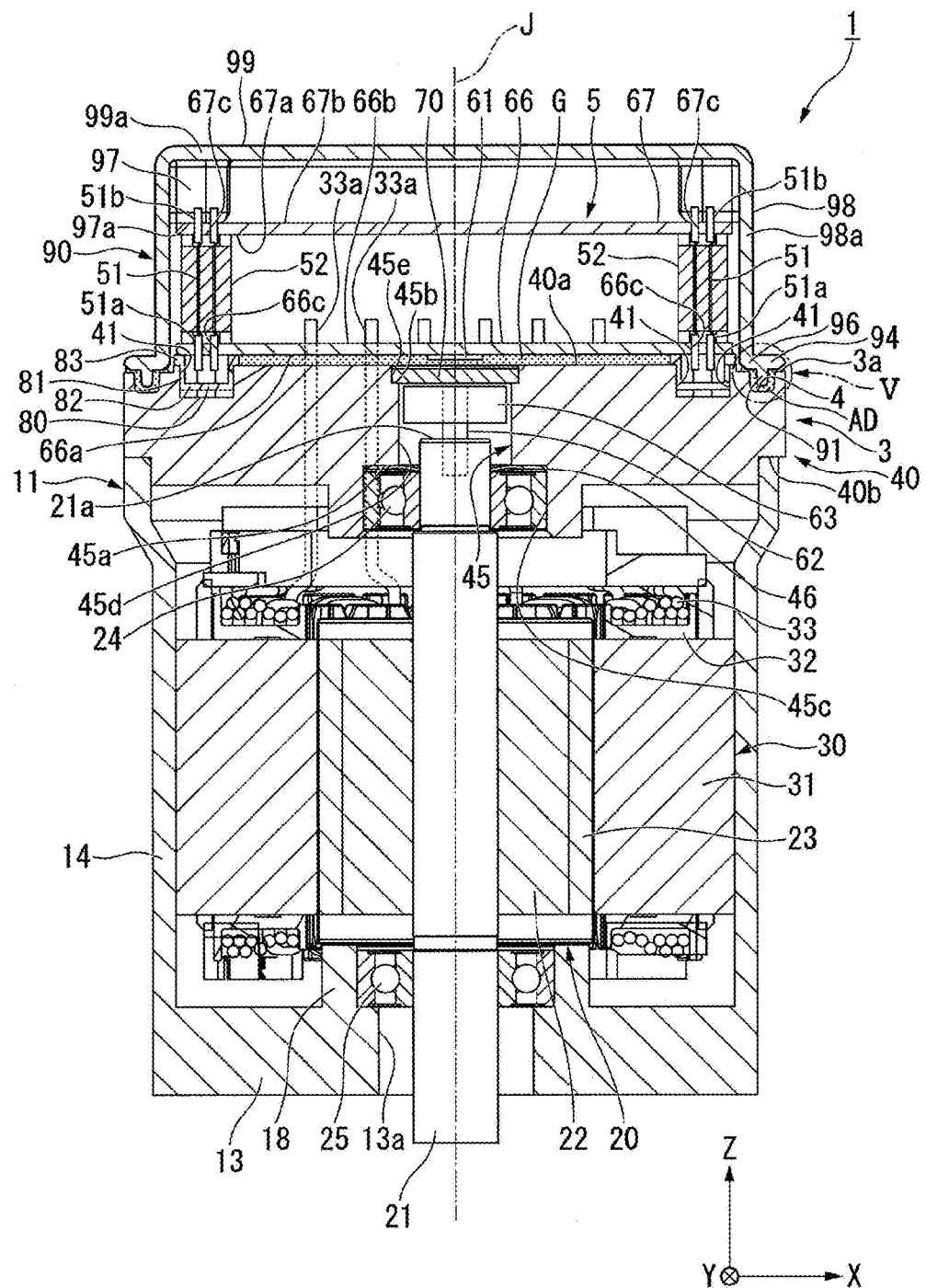
FIG. 1 is a cross-sectional view through a central axis of a motor according to an example embodiment of the present disclosure.

Hereinafter, motors according to example embodiments of the present disclosure will be described with reference to the drawings. The scope of the present disclosure is not limited to the following example embodiments, but can be arbitrarily changed within the scope of the technical idea of the present disclosure. In the following drawings, the actual structure and the scale and number in each structure may be different in order to make each structure easy to understand.

Further, in the drawing, the XYZ coordinate system is appropriately represented as a three-dimensional rectangular coordinate system. In the XYZ coordinate system, the Z-axis direction is set to be parallel to the axial direction of the central axis J shown in FIG. 1. The X-axis direction is a direction orthogonal to the Z-axis direction, and is set to the left-right direction in FIG. 1. The Y-axis direction is a direction orthogonal to both the X-axis direction and the Z-axis direction.

Further, in the following description, the positive side (+Z side, one side) in the Z axis direction will be referred to as "upper side", and the negative side (−Z side, the other side) in the Z axis direction will be referred to as "lower side". Further, note that the upper side and the lower side are names used for illustration only and do not limit the actual positional relationship or direction. Further, unless otherwise stated, a direction parallel to the central axis J (Z-axis direction) is referred to simply as "axial direction", a diameter direction centered on a central axis J is simply referred to as "diameter direction", and a direction around the central axis J, that is, a circumferential direction around the center axis J is simply called "circumferential direction". Further, in the following description, "when viewed in plan" means a state viewed from the axial direction.

Figure 2:
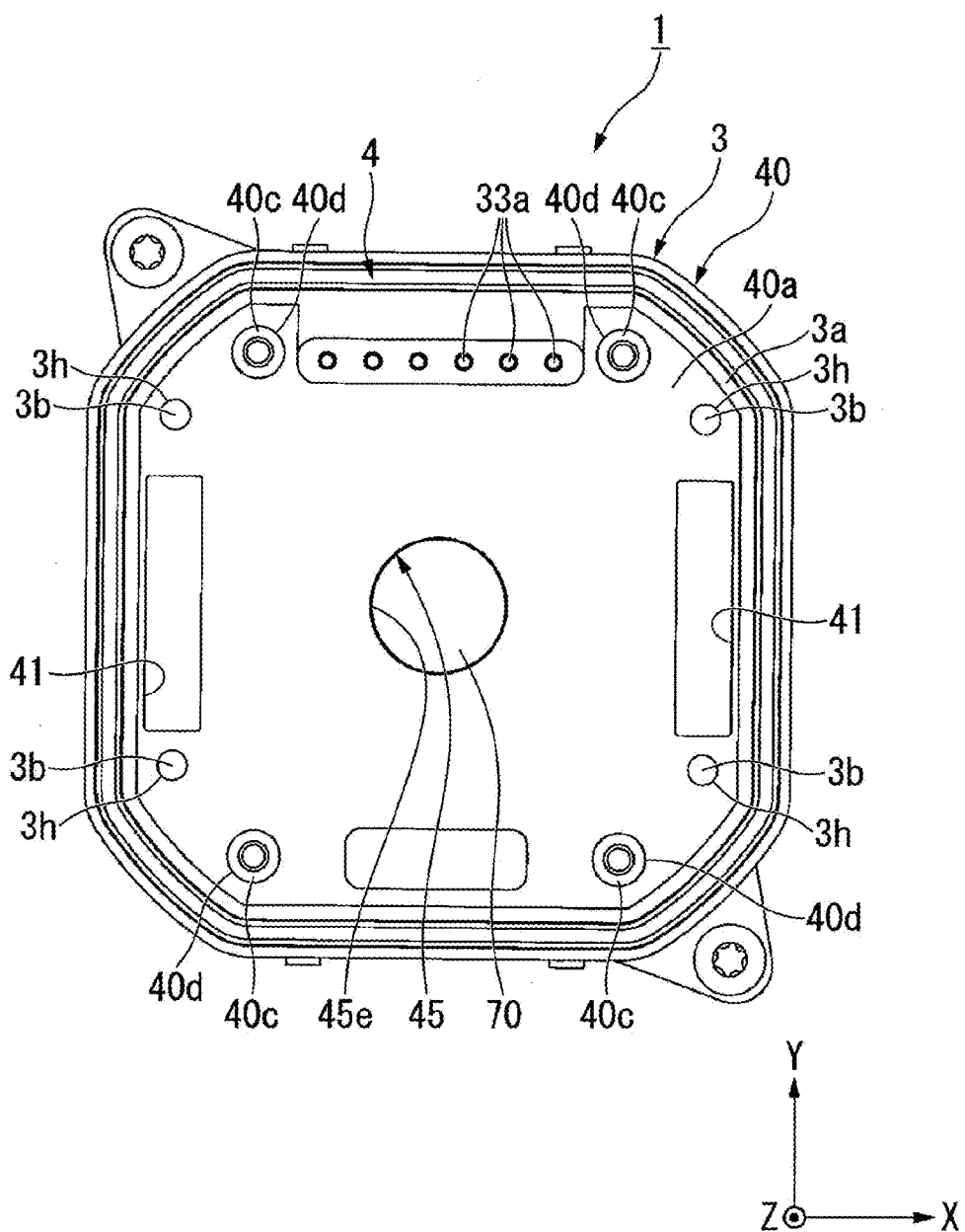
FIG. 2 is a plan view of a motor main body in a motor of one example embodiment of the present disclosure.
Figure 3:
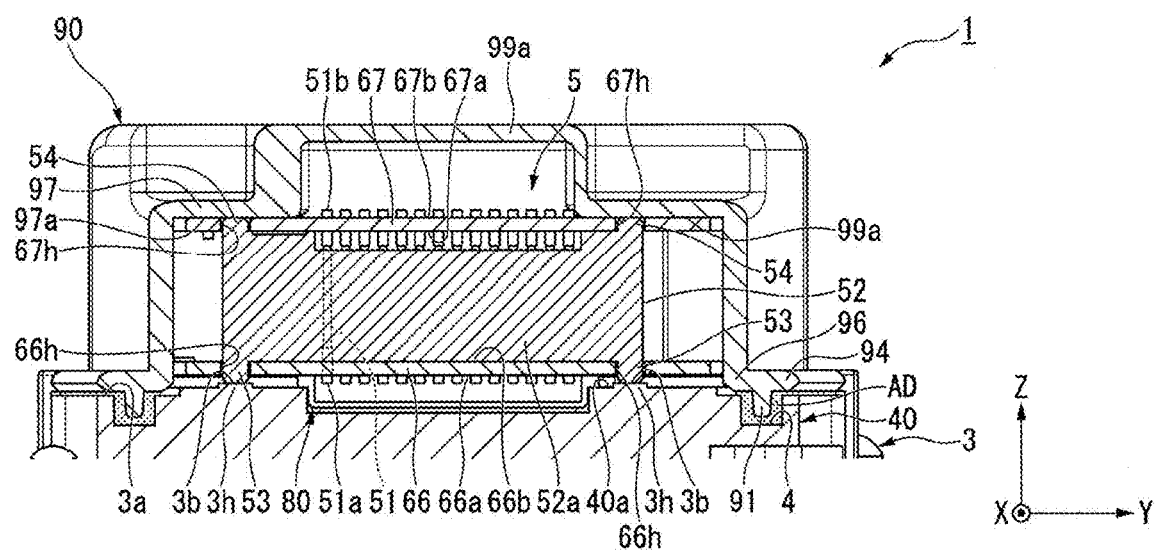
FIG. 3 is a partial sectional view of a motor of one example embodiment of the present disclosure.

FIG. 1 is a cross-sectional view of the motor 1 of the present example embodiment. FIG. 2 is a plan view of the motor main body 3 in the motor 1 of the present example embodiment. FIG. 3 is a partial cross-sectional view of the motor 1.

As shown in FIG. 1, the motor 1 includes a motor main body 3, a control unit 5, and a cover 90. The motor main body 3 has a rotor 20 that rotates about a central axis J extending in the up-down direction. A control unit 5 is located on the upper side of the motor main body 3. The control unit 5 controls the rotation of the rotor 20. The cover 90 surrounds the control section 5 from the outside in the radial direction and from above.

The motor main body 3 includes a motor housing 11, a rotor 20 having a shaft 21, a stator 30, an upper bearing 24, a lower bearing 25, a sensor magnet 63, a bearing holder (heat sink) 40, and a heat dissipating grease (heat dissipating material) G.

The motor housing 11 is cylindrical in shape opening upward (+Z side). The motor housing 11 houses the respective members of the motor main body 3. The motor housing 11 has a first cylindrical portion 14, a first bottom portion 13, and a lower bearing holding portion 18. The first cylindrical portion 14 has a cylindrical shape surrounding the radially outer side of the stator 30. In the present example embodiment, the first cylindrical portion 14 is, for example, a cylindrical shape. The first cylindrical portion 14 is fitted in a stepped portion 40b formed on the peripheral edge of the bearing holder 40 at the upper end. A stator 30 is fixed to the inner surface of the first cylindrical portion 14.

The first bottom portion 13 is provided at the end portion of the lower side (−Z side) of the first cylindrical portion 14. The first bottom portion 13 is formed with an output axis hole portion 13a passing through the first bottom portion 13 in the axial direction (Z-axis direction). The lower side bearing holding portion 18 is provided on the surface of the upper side (+Z side) of the first bottom portion 13. The lower side bearing holding portion 18 holds the lower side bearing 25.

The rotor 20 has a shaft 21, a rotor core 22, and a rotor magnet 23. The shaft 21 is centered on a central axis J extending in the up-down direction (Z-axis direction). The shaft 21 is rotatably supported by the lower bearing 25 and the upper side bearing 24 about the axis of the central axis J. The end of the lower side (−Z side) of the shaft 21 protrudes to the outside of the motor housing 11 through the output shaft hole portion 13a. A coupler (not shown) for connecting to, for example, an output target is press-fitted into the lower end of the shaft 21. A hole is formed in the upper surface 21a of the shaft 21. In the hole of the shaft 21, an attaching member 62 is fitted. The attachment member 62 is a rod-shaped member extending in the axial direction.

The rotor core 22 is fixed to the shaft 21. The rotor core 22 surrounds the shaft 21 in the circumferential direction. The rotor magnet 23 is fixed to the rotor core 22. More specifically, the rotor magnet 23 is fixed to the outer surface of the rotor core 22 along the circumferential direction. The rotor core 22 and the rotor magnet 23 rotate together with the shaft 21.

The stator 30 surrounds outward in the diameter direction of the rotor 20. The stator 30 has a stator core 31, a bobbin 32, and a coil 33. The bobbin 32 is made of a material having an insulating property. The bobbin 32 covers at least a part of the stator core 31. At the time of driving the motor 1, the coil 33 excites the stator core 31. The coil 33 is constituted by winding a coil wire 33a. The coil wire 33a is wound around the stator via the bobbin 32. The end of the coil wire 33a is drawn upward. The drawn coil wire 33a passes through the bearing holder 40 and extends to an upper side of a first substrate 66 to be described later and is connected to the first substrate 66.

The upper bearing 24 rotatably supports the upper end of the shaft 21. The upper side bearing 24 is located on the upper side (+Z side) of the stator 30. The upper side bearing 24 is held in the bearing holder 40. The lower side bearing 25 rotatably supports the lower end of the shaft 21. The lower bearing 25 is located on the lower side (−Z side) of the stator 30. The lower side bearing 25 is held in the lower side bearing holding portion 18 of the motor housing 11.

In the present example embodiment, the upper bearing 24 and the lower side bearing 25 are ball bearings. However, the types of the upper side bearing 24 and the lower side bearing 25 are not particularly limited, and may be other types of bearings.

A sensor magnet 63 is fixed to the upper side of the shaft 21 through the attachment member 62. In the present example embodiment, the sensor magnet 63 has a toroidal shape. The sensor magnet 63 is fitted to the outer circumferential surface of the attachment member 62 fixed to the shaft 21. The sensor magnet 63 rotates together with the shaft 21 about the central axis J. The shape and the attachment structure of the sensor magnet 63 are not limited to the present example embodiment. For example, the sensor magnet 63 may be directly attached to the front end of the shaft 21 with an adhesive or the like.

The bearing holder 40 is located on the upper side (+Z side) of the stator 30. The bearing holder 40 holds the upper side bearing 24. The shape (viewed from the XY plane) of the bearing holder 40 is, for example, a circular shape concentric with the central axis J. The bearing holder 40 is made of metal. The bearing holder 40 is sandwiched between the motor housing 11 and the cover 90.

The bearing holder 40 is formed with a through hole 45 passing through in the up-down direction. The through hole 45 is located approximately at the center of the bearing holder 40 when seen in plan view. The upper end of the shaft 21 and the sensor magnet 63 are disposed inside the through hole 45.

On the inner peripheral surface of the through hole 45, a downward stepped surface 45a, an upward stepped surface 45b, a lower inner circumferential surface 45c, a middle inner circumferential surface 45d, and an upper inner circumferential surface 45e are formed. The downward stepped surface 45a is a stepped surface facing downward. The downward stepped surface 45a is located near the lower side of the through hole 45. The upper stage surface 45b is a step surface facing upward. The upper stepped surface 45b is located near the upper side of the through hole 45. The lower inner peripheral surface 45c is positioned below the downward stepped surface 45a. The intermediate inner peripheral surface 45d is located between the downward stepped surface 45a and the upward stepped surface 45b. The upper inner peripheral surface 45e is located above the upward step surface 45b. The lower inner circumferential surface 45c, the intermediate inner circumferential surface 45d, and the upper inner circumferential surface 45e are circular concentric when viewed from the axial direction. The inner diameters of the lower inner peripheral surface 45c and the upper inner peripheral surface 45e are larger than the diameters of the intermediate inner peripheral surface 45d.

The through hole 45 accommodates the upper bearing 24 in an area below the downward stepped surface 45a (the area surrounded by the lower inner peripheral surface 45c). The through hole 45 accommodates the sensor magnet 63 in an area between the downward stepped surface 45a and the upward stepped surface 45b (the area surrounded by the intermediate inner circumferential surface 45d). The through hole 45 accommodates the lid body 70 in an area above the upper stepped surface 45b (the area surrounded by the upper inner peripheral surface 45e).

The upper surface of the outer ring of the upper bearing 24 is brought into contact with the downward stepped surface 45a via the wave washer 46. The lower inner peripheral surface 45c is fitted to the outer ring of the upper bearing 24. Since the downward stepped surface 45a is formed, it is possible to easily position the upper bearing 24 with respect to the bearing holder 40. In addition, a preload can be given to the upper bearing 24 by interposing the wave washer 46 between the downward stepped surface 45a and the outer ring of the upper bearing 24.

The bearing holder 40 has a first upper surface 40a, a second upper surface (sealing surface) 3a, and a third upper surface (first contact surface) 3b. That is, the motor main body 3 has a first upper surface 40a, the second upper surface 3a, and the third upper surface 3b. The first upper surface 40a, the second upper surface 3a, and the third upper surface 3b are surfaces facing upward.

The accommodating concave portion 41 is opened upward. a spacer 80 is inserted into the accommodating concave portion 41. The spacer 80 has a side wall portion 81 along an inner surface of the accommodating concave portion 41, a bottom wall portion 82 along a bottom surface of the accommodating concave portion 41, and a flange portion 83 located at a top of the side wall portion 81. The spacer 80 is made of an insulating material.

As shown in FIG. 2, four convex portions 40d are formed on the first upper surface 40a. The four convex portions 40d are arranged at regular intervals along a circumferential direction. The bearing holder 40 contacts the first substrate 66 on an upper surface (a fourth upper surface) 40c of the convex portions 40d. The upper surface 40c of the convex portions 40d is one of the surfaces facing an upper side of the motor main body 3 (that is, the upper surface). In the following description, the upper surface 40c of the convex portions 40d may be described as a fourth upper surface 40c of the motor main body 3 or the bearing holder 40.

When viewed in plan, the second upper surface 3a is formed in an annular shape surrounding the first upper surface 40a from the outward diameter direction. And a groove portion 4 opened upward is formed on the second upper surface 3a. The groove portion 4 extends in an annular shape when viewed in plan and surrounds the central axis J along the circumferential direction. As described later, the lower end portion 91 of the cover 90 is inserted into the groove 4. Further, an adhesive (sealing member) AD is filled in an inside of the groove portion 4. As a result, the motor body 3 and the cover 90 are fixed to each other.

The third upper surface 3b is located on an inner side of the first upper surface 40a when viewed in plan. As shown in FIG. 3, the third upper surface 3b is an upper surface of a columnar convex portion 3h protruding upward from the first upper surface 40a.

As shown in FIG. 1, a heat dissipating grease G is located between the first upper surface 40a of the bearing holder 40 and the lower surface 66a of the first substrate 66. The heat dissipating grease G transfers heat generated in the first substrate 66 and mounting components mounted on the first substrate 66 to the bearing holder 40. The bearing holder 40 dissipates the heat transmitted from the heat dissipating grit G to the outside. That is, according to the present example embodiment, the bearing holder 40 can function as a heat sink.

A cover body 70 is attached to the through hole 45 of the bearing holder 40. The cover body 70 covers and closes an opening on the upper side of the through hole 45. The cover body 70 suppresses a penetration of the heat dissipating grease G into the through hole 45. The cover body 70 is disk-shaped. The cover body 70 is fitted to the upper inner circumferential surface 45e of the through hole 45.

As shown in FIG. 1, the control unit 5 includes the first substrate 66, a second substrate 67, a plurality of press-fit pins 51 for connecting the first and second substrates 66 and 67, and a pair of support members 52 for supporting the plurality of press fitting pins 51. The number of substrates used in the motor 1 is not limited to two, and may be one, or three or more.

The first and second substrates 66 and 67 control the motor 1. Electronic components are mounted on the first and second substrates 66 and 67. The electronic components mounted on the first and second substrates 66 and 67 are a rotation sensor 61, an electrolytic capacitor, a choke coil, and the like. A coil wire 33a extending from the stator 30 and extending upward is connected to the first substrate 66. It is preferable that a heat generating element of the electronic components is mounted on the first substrate 66. In this case, heat generated from the heat generating element can be radiated efficiently through the bearing holder 40. In this case, the bearing holder 40 functions as a heat sink. In this specification, the heat generating element means an element that generates heat and becomes a high temperature among electronic components mounted on a substrate. Examples of the heat generating element include a field effect transistor, a capacitor, a driver integrated circuit for driving a field effect transistor, an integrated circuit for power supply, a switching element, a semiconductor switch element, and the like. And, type of the heat generating element is not limited as long as it is a high temperature element.

Two mounting parts of equivalent function are mounted on the first and second substrates 66 and 67. Further, the first and second substrates 66 and 67 are formed with two equivalent circuits for connecting respective mounting components. The mounting components and the circuits constitute the control circuit. That is, the control unit 5 has two control circuits of equivalent function. As a result, the control unit 5 has high redundancy. The control unit 5 can continue drive of the motor 1 by the control circuit of one system even if a problem arises in the control circuit of the other system.

The first substrate 66 is disposed on the upper side (+Z side) of the bearing holder 40. The first and second substrates 66 and 67 are similar in shape in which they are completely overlapped with each other when viewed from the axial direction (see FIG. 4). The second substrate 67 is disposed on the upper side of the first substrate 66 and on the lower side of the second bottom 99 of the cover 90. The plate surface directions of the first and second substrates 66 and 67 are all orthogonal to the axial direction. That is, the first and second substrates 66 and 67 are disposed along an orthogonal direction to the central axis J. The first and second substrates 66 and 67 are disposed so as to overlap with each other when viewed from the axial direction. A gap along the axial direction is formed between the first substrate 66 and the second substrate 67.

The first substrate 66 has a lower surface 66a and an upper surface 66b. Similarly, the second substrate 67 has a lower surface 67a and an upper surface 67b. The upper surface 66b of the first substrate 66 and the lower surface 67a of the second substrate 67 are faced each other in the up-down direction with a gap therebetween. The lower surface 66a of the first substrate 66 and the fourth upper surface 40c of the bearing holder 40 are in direct contact with each other. That is, the first substrate 66 contacts the fourth upper surface of the motor main body 3. The gap between the lower surface 66a of the first substrate 66 and the first upper surface 40a of the bearing holder 40 is filled with the heat dissipating grease G. The upper surface 67b of the second substrate 67 is in direct contact with an lower surface 97a of the cover 90. In this specification, the term "contact" of two members means the concept including a case of "contacting through" another member prepared separately, if the position of the two members is uniquely determined in the direction in which the two members are in contact with each other. Accordingly, the first substrate 66 contacts the first upper surface 40a of the motor main body 3. In this specification, when the two members make contact with each other on a common contact surface, they are referred to as "contact directly".

On the lower surface 66a of the first substrate 66, a rotation sensor 61 is mounted. The rotation sensor 61 is disposed so as to overlap with the sensor magnet 63 of the first substrate 66 when viewed from the axial direction. The rotation sensor 61 detects the rotation of the sensor magnet 63. In the present example embodiment, the rotation sensor 61 is a magnetoresistive element. The rotation sensor 61 may be, for example, a hall element.

The first and second substrates 66 and 67 are provided with a plurality of holes 66c and 67c penetrating in the up-down direction, respectively. The plurality of holes 66c of the first substrate 66 and the plurality of holes 67c of the second substrate 67 are overlapped with each other as viewed from the axial direction. The distal end portions 51a and 51b of the press fitting pin 51 are inserted into the holes 66c and 67c, respectively.

As shown in FIG. 1, the press fitting pin 51 extends along the up-down direction. The press fitting pin 51 has a first distal end portion 51a located on the lower side and a second distal end portion 51b located on the upper side. The diameters of the first and second distal end portions 51a and 51b are slightly larger than the diameters of the holes 66c and 67c formed in the first and second substrates 66 and 67, respectively. The first distal end portion 51a is press fitted into the hole 66c of the first substrate 66 from the upper surface 66b. Also, the second distal end portion 51b is press fitted into the hole 67c of the second substrate 67 from the lower surface 67a. Thus, the press fitting pin 51 is electrically connected to the first and second substrates 66 and 67. That is, both ends (the first front end portion 51a and the second front end portion 51b) of the press fitting pin 51 are inserted into the holes 66c and 67c formed in the other substrates 66 and 67, respectively, and are electrically connected.

The shapes of the distal end portions 51a and 51b are not limited to the present example embodiment. For example, the first distal end portions 51a and 51b may be tapered in shape, or may be plate shaped in the up-down direction as direction of a length. The diameter of the first distal end portion 51a at the depth inserted into the first and second substrates 66 and 67 may be larger than the diameter of the holes 66c and 67c when the first portions 51a and 51b are tapered in shape. Also, the maximum length in the cross section orthogonal to the up-down direction of the distal end portions 51a and 51b may be larger than the diameter of the holes 66c and 67c when the distal end portions 51a and 51b are formed in the plate shape. Thereby, contact pressure can be generated at the contact portions between the inner circumferential surfaces of the holes 66c and 67c and the distal end portions 51a and 51b to be electrically connected. Likewise, the shape of the holes 66c and 67c of the first and second substrates 66 and 67 is not limited to a circular shape, and may be, for example, long hole shape extending in a direction orthogonal to the up-down direction. When the holes 66c and 67c are long hole shape and the distal end portions 51a and 51b have a cylindrical shape, the dimension in the width direction of the long hole shape holes 66c and 67c may be smaller than the diameter of the distal end portions 51a and 51b.

A support member 52 is positioned between the first substrate 66 and the second substrate 67 in the up-down direction. The pair of support members 52 support the plurality of press-fitting pins 51, respectively. That is, the press-fitting pin 51 is fixed to the support member 52. The constituent material of the support member 52 is an insulating material such as a resin. It is possible to suppress the conduction of the press-fitting pins 51 by the support member 52 supporting the plurality of press fitting pins 51. As shown in FIG. 3, the support member 52 has a support member main body portion 52a, a pair of first protrusions 53, and a pair of second protrusions 54.

The support member main body portion 52a is positioned between the first substrate 66 and the second substrate 67, and holds the press fitting pin 51.

The first protrusions 53 protrude upward from the support member main body portion 52a. The first protrusions 53 pass through the first through hole 66h formed in the first substrate 66. The lower end surface of the first protrusions 53 contact the third upper surface 3b of the motor main body 3. The second protrusions 54 protrude downward from the support member main body portion 52a. The second protrusions 54 pass through the second through holes 67h formed in the second substrate 67. The lower end surface of the second protrusions 54 contact the lower surface 97a of the cover 90.

According to the present example embodiment, the support member 52 contacts the third upper surface 3b of the motor body 3 in the first protrusion portion 53, and contacts the lower surface 97a of the cover 90 in the second protrusion portion 54. Therefore, the support member 52 is fitted the motor body 3 and the cover 90 in the up-down direction in a state of being contacted. The relatively positions of the motor body 3 and the cover 90 in the up-down direction is determined by the distance between the lower surface of the first protrusion 53 and the upper surface of the second protrusion 54 of the support member 52. That is, according to the present example embodiment, the accuracy of positional accuracy of the cover 90 with respect to the motor body 3 in the up-down direction can be enhanced by performing the precise dimension management of the first protrusion portion 53 and the second protrusion portion 54 in the up-down direction.

According to the present example embodiment, the two or more first protrusion portions 53 inserted into the first through holes 66h of the first substrate 66 are formed in the support member 52. The press fitting pin 51 is press fitted into the first substrate 66 in a state of being supported by the support member 52. The lower surface of the first protrusion portion 53 is located below the distal end portion of the lower side of the press fitting pin 51. Therefore, when the support member 52 is moved downward in the press-fitting process, the first protrusion portion 53 is inserted into the first through hole 66h before the press-fitting is started. When the two or more first protrusion portion 53 are respectively inserted into the first through holes 66h, the position of the support member 52 with respect to the first substrate 66 in the horizontal direction can be determined. In addition, it is possible to prevent the support member 52 from tilting with respect to the first substrate 66. Thereby, the press fitting pin 51 can be press-fitted into the first substrate 66 in a state of being determined the position in the horizontal direction. According to the present example embodiment, press-fitting of the press fitting pin 51 to the first substrate 66 can be stably performed. The same effect can be obtained with respect to the second protrusion portion 54 as well. That is, according to the present example embodiment, since the second projection portion 54 is formed on the support member 52 more than two, it is possible to stably press fit the press fitting pin 51 into the second substrate 67.

Figure 4:
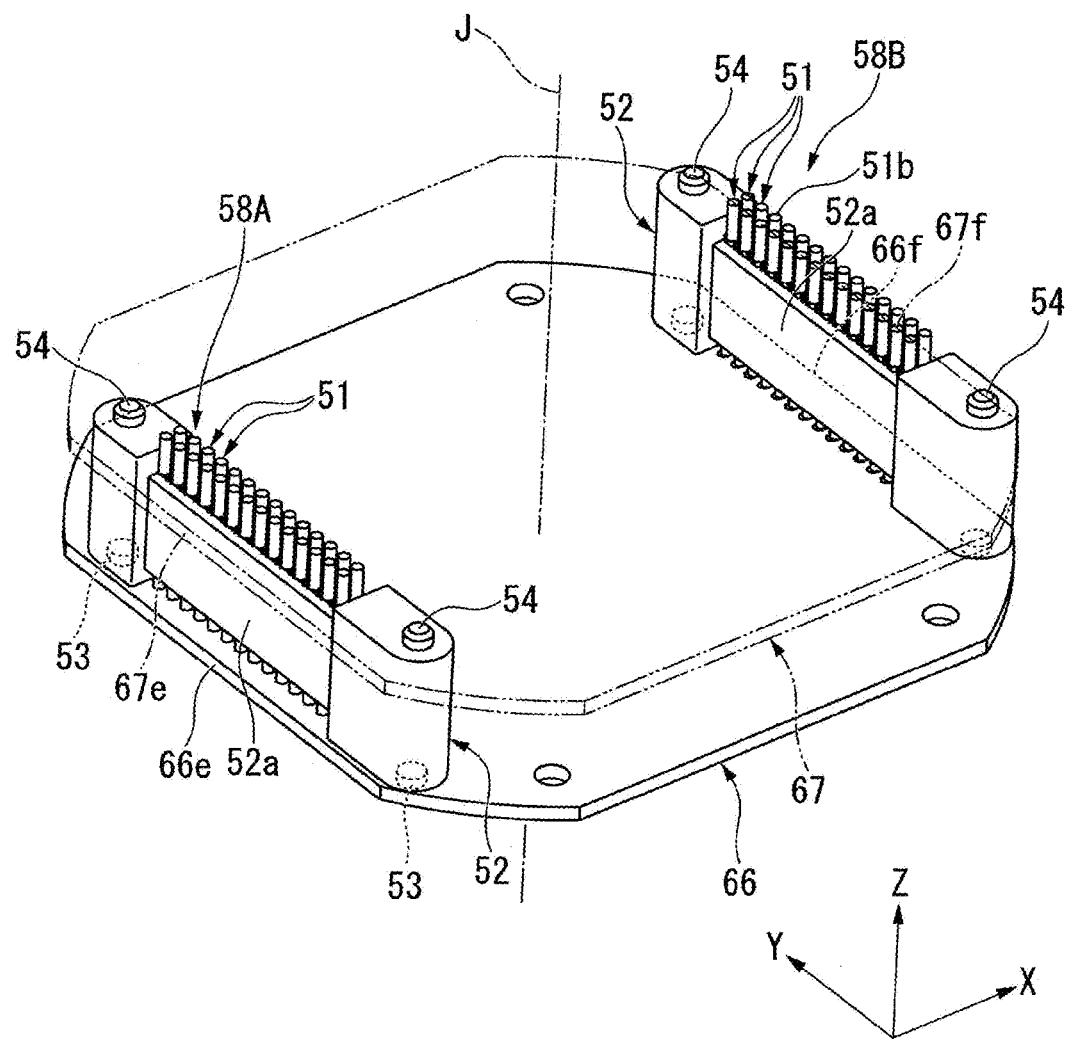
FIG. 4 is a perspective view of a controller of a motor according to an example embodiment of the present disclosure.

FIG. 4 is a perspective view of the control unit 5 of the motor 1. In FIG. 4, the second substrate 67 is shown by a two-dot chain line for convenience of explanation. As shown in FIG. 4, the pair of support members 52 are located on opposite sides in the diameter direction with the central axis J therebetween. The pair of support members 52 are respectively disposed at the end portions 66e and 66f on both sides in the diameter direction of the first substrate 66 when viewed in plan. Likewise, the pair of support members 52 are respectively disposed at the end portions 67e and 67f on both sides in the diameter direction of the second substrate 67 when viewed in plan. That is, the pair of support members 52 are respectively located in the first end portions 66e and 67e on one side of the diameter direction of the first and second substrates 66 and 67 and the second end portions 66f and 67f on the other side of the diameter direction.

In the first and second substrates 66 and 67, it is difficult to use the area where the support member 52 is disposed as the mounting area. By disposing the support member 52 at the end portions 66e, 66f, 67e, 67f, an area near the center of the first and second substrates 66, 67 can be used as the mounting area. Thereby, the degree of freedom in disposing conductor patterns and mounting components of the first and second boards 66 and 67 can be increased.

The pair of support members 52 may be disposed on either one of the first ends 66e and 67e of the first and second substrates 66 and 67 and on either of the second ends 66f and 67f. The case where the first and second substrates 66 and 67 are disposed to be shifted from each other as viewed from the axial direction will be described as an example. In this case, the pair of support members 52 may be disposed, for example, at the first end 66e of the first substrate 66 and at the second end 67f of the second substrate 67, respectively.

In the present specification, the end portion of the substrate is an area located closer to the inside than the of the end surface of the substrate and near the end surface when seen in plan view. More specifically, it means an area located within 30% of the distance between the end surface and the center line toward the inward diameter direction from the end surface. Here, the end surface is a surface facing the outward diameter direction of the substrate.

The pair of support members 52 support the twenty eight press-fit pins 51, respectively. The plurality of press-fit pins 51 are classified into a first pin group 58A supported by one support member 52 and a second pin group 58B supported by the other support member 52. In the first and second groups of pins 58A and 58B, the press-fit pins 51 are arranged along one direction in a horizontal plane (i.e., in the XY plane) side by side in two rows. As described above, the control unit 5 has two systems of control circuits. The first pin group 58A performs a part of one of the two control circuits and the second pin group 58B controls a part of the other control circuit.

The support member main body portion 52a of the support member 52 holds a portion located between the distal end portions 51a and 51b of the press fitting pin 51. The first and second protrusions 53 and 54 are respectively located on both sides in the arrangement direction of the press-fitting pins 51 when seen in plan view. Therefore, two of each the first and second protrusions 53 and 54 are formed for one support members 52. Therefore, the controller 5 is provided with four of each first and second protrusions 53 and 54.

According to the present example embodiment, three or more first and second protrusions 53 and 54 are respectively formed in the control unit 5. Thereby, the cover 90 can be supported at three or more points with respect to the motor main body 3. Therefore, the position of the motor body 3 and the cover 90 can be determined in the axial direction without generating a relative inclination.

The support member 52 of this example embodiment contacts the motor body 3 and the cover 90 at the first and second protrusions 53 and 54, respectively. However, the support member 52 may not have the first and second protrusions 53 and 54 if the support member 52 contacts the motor main body 3 on the surface facing downward and contacts the motor main body 3 on the surface facing upward. As an example, protrusion portion protruding from the motor body and the cover toward the support member may be formed, and the motor main body and the cover and the support member may be in contact with the protrusions portion.

As shown in FIG. 1, the cover 90 is located on the upper side (+Z side) of the motor main body 3. The cover 90 has a cylindrical shape that opens to the lower side (−Z side). The cover 90 accommodates the control portion 5. The lower opening of the cover 90 is covered by the motor main body 3.

The cover 90 has a second cylindrical portion 98 and the second bottom portion 99. The second bottom portion 99 is provided at the upper end (+Z side) of the second cylindrical portion 98. The second bottom portion 99 covers the upper opening of the second cylindrical portion 98.

As shown in FIG. 3, the second bottom portion 99 has a bottom body 99a and a stepped portion 97 recessed downward with respect to the bottom body 99a. The stepped portion 97 has a lower surface (a second contact surface) 97a. The lower surface 97a is a surface facing downward. The lower surface 97a contacts with the upper surface 67b of the second substrate 67 to face each other in the up-down direction. Also, the lower surface 97a contacts with the second protrusions 54 of the support member 52 to face each other in the up-down direction.

As shown in FIG. 1, the second cylindrical portion 98 surrounds the outside in the diameter direction of the control unit 5. The second cylindrical portion 98 has a cylindrical body 98a, a lower end portion 91 located below the cylindrical body 98a, an outer flange portion 94 located between the cylindrical body 98a and the lower end portion 91, and an inner flange portion 96. That is, the cover 90 has a lower end portion 91, an outer flange portion 94, and an inner flange portion 96.

The lower end portion 91 is inserted into the groove portion 4 filled with the adhesive AD. The motor main body 3 and the cover 90 are fixed by the adhesive AD. Further, the adhesive AD functions as a sealing member. That is, the second upper surface 3a of the motor main body 3 and the lower end portion 91 of the cover 90 are sealed by the sealing member (the adhesive AD). In this example embodiment, an example in which the adhesive AD is employed as the sealing member is illustrated. However, a packing or the like can be employed as a sealing member for closing the gap between the motor main body 3 and the cover 90.

Next, the process of mounting the control unit 5 and the cover 90 to the motor main body 3 of the present example embodiment will be described mainly based on FIG. 3. First, the spacer 80 is inserted into the accommodating concave portion 41 formed on the first upper surface 40a of the motor main body 3. Subsequently, the first substrate 66 is mounted on the first upper surface 40a with a spacer 80 interposed therebetween. Subsequently, the spacer 80 and the first substrate 66 are screwed to the motor body 3. Subsequently, a pair of support members 52 for holding the plurality of press fitting pins 51 are disposed on the upper side of the first substrate 66. Further, the support member 52 is moved downward until the first protrusion portion 53 contacts the third upper surface 3b of the motor main body 3. As the support member 52 moves downward, the press fitting pin 51 is press-fitted into the hole 66c of the first substrate 66. Subsequently, the adhesive AD is filled in the inside of the groove portion 4. Here, separately, a subassembly having the second substrate 67 fixed to the cover 90 is prepared. The subassembly is assembled by screwing the second substrate 67 to the cover 90. Subsequently, the subassembly is moved downward until the second protrusion portion 54 contacts the lower surface 97a of the cover 90. At this step, the snapfit portion 6 (referring FIG. 6, described later) acts on the motor main body 3 and the cover 90. The snapfit portion 6 temporarily fixes the motor main body 3 and the cover 90 while the adhesive AD hardens. Subsequently, standby until the surface of the adhesive AD is hardened.

According to the present example embodiment, the press fitting of the press fitting pin 51 with respect to the first substrate 66 is completed by moving the support member 52 downward to a position where the first protrusion portion 53 contacts the third upper surface 3b of the motor main body 3. Thereby, the press fitting depth of the first distal end portion 51a of the press fitting pin 51 can be easily controlled. In other words, it is possible to suppress the deviation of the position of the press fitting pin 51 in the axial direction with respect to the first substrate 66. Also, the same effect can be obtained with respect to the second protrusion 54. That is, according to the present example embodiment, the press fitting of the press fitting pin 51 with respect to the second substrate 67 is completed by moving the cover 90 downward to a position where the second projection portion 54 contacts the lower surface 97a of the cover 90. Therefore, it is possible to suppress the deviation of the position of the press fitting pin 51 in the axial direction with respect to the second substrate 67.

According to the present example embodiment, since the press fitting pin 51 is supported by the support member 52, the load at the time of press fitting of the press fitting pin 51 is applied to the support member 52. As a result, breakage such as buckling of the press fitting pin 51 can be suppressed.

According to the present example embodiment, by holding the plurality of press fitting pins 51 at once on the support member 52, the plurality of press fitting pins 51 can be simultaneously press fitted, and the press-fitting operation can be simplified.

According to the present example embodiment, the support member 52 is interposed between the motor body 3 and the cover 90 in the up-down direction. Thereby, a gap can be formed between the motor body 3 and the cover 90 in the up-down direction. Further, according to the present example embodiment, the motor main body 3 and the cover 90 are sealed with the adhesive (the sealing member) AD. In other words, the two members that are in contact with the upper and lower sides of the support member 52 and the two members that are sealed with each other are the same members. That is, according to the present example embodiment, since the gap is formed between the members that contact at the upper side and the lower side by the support member 52, the inside and outside of the cover 90 can be sealed by disposing the sealing member at the gap.

In the example embodiment described above, a first upper surface 40a, a second upper surface 40b, and a third upper surface 3b are formed as the surface facing the upper side of the motor main body 3. Further, the lower surface 66a of the first substrate 66 contacts the first upper surface 40a with the spacer 80 interposed therebetween. The first protrusion portion 53 of the support member 52 contacts the third upper surface 3b. However, the first upper surface 40a, the second upper surface 40b, and the third upper surface 3b may have the same position of the up-down direction and the same plane. That is, the surface on which the spacer 80 and the first projection 53 contact may be the same. In the above described example embodiment, the second protrusion portion 54 of the support member 52 and the upper surface 67b of the second substrate 67 contact the lower surface 97a of the cover 90. However, the cover 90 may have a structure in which two lower surfaces having different positions in the axial direction are provided, the second protrusion 54 contacts one surface, and the upper surface 67b of the second substrate 67 contacts the other surface.

Figure 5:
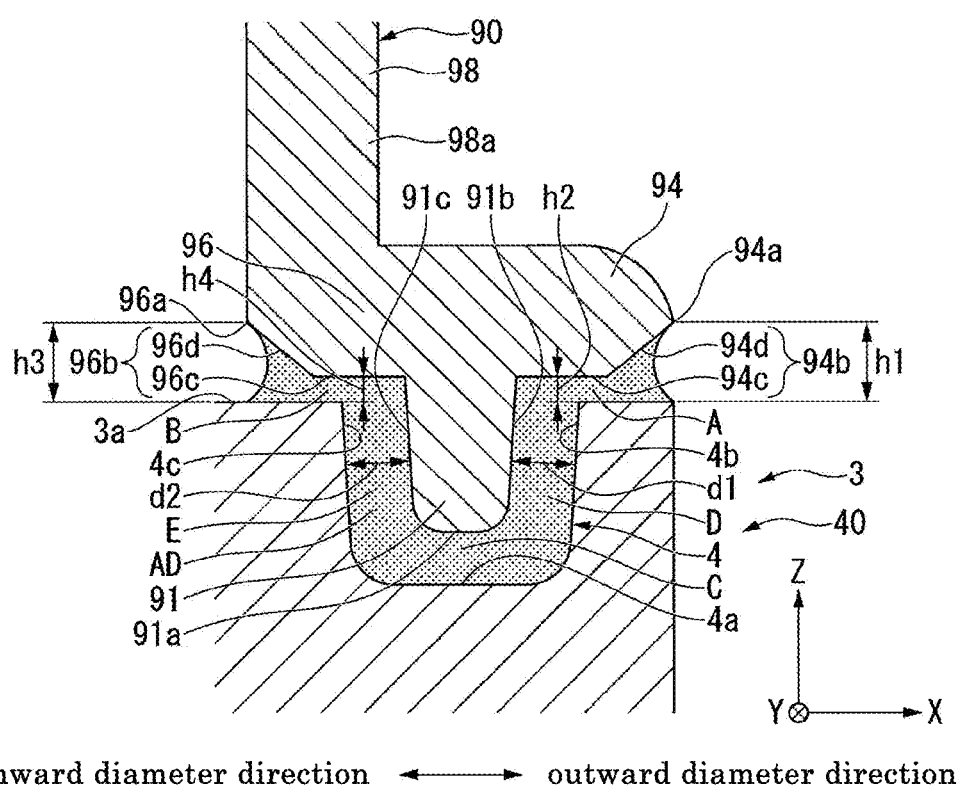
FIG. 5 is an enlarged view of a region V in FIG. 1.

Next, the sealing structure by the adhesive AD between the motor body 3 and the cover 90 will be described in more detail. FIG. 5 is an enlarged view of an area V in FIG. 1. As shown in FIG. 1, a first space A, a second space B, a third space C, a fourth space D, and a fifth space E are formed between the lower end portion 91, the outer flange portion 94, the inner flange portion 96, and the motor body 3. The second space B, the fifth space E, the third space C, the fourth space D, and the first space A are arranged in this order from the outward diameter direction. The first space A, the second space B, the third space C, the fourth space D, and the fifth space E are filled with the adhesive AD.

The adhesive AD of the present example embodiment is a moisture curable adhesive. The moisture curable adhesive is cured by moisture in the air. By using the moisture curable adhesive as the adhesive AD, deterioration of the adhesive due to moisture can be suppressed, and reliability of waterproofing between the cover 90 and the motor main body 3 can be enhanced.

The lower end portion 91 extends along the vertical direction. And the lower end portion 91 extends along the circumferential direction. The lower end portion 91 is inserted into the groove portion 4 formed in the second upper surface (hereinafter referred to as sealing surface) 3a of the motor main body 3. As shown in FIG. 2, the groove portion 4 extends in an annular shape surrounding the central axis J. The lower end portion 91 extends in an annular shape so as to overlap with the groove portion 4 when viewed in plan. The lower end portion 91 is inserted into the groove portion 4 over the entire length of the groove portion 4.

As shown in FIG. 5, the lower end portion 91 has a lower surface 91a as a downward facing surface, a first side surface 91b toward the outward diameter direction, and a second side surface 91c toward the inward diameter direction. On the other hand, the groove portion 4 has a bottom surface 4a facing upward, a first inner wall surface 4b facing the inward diameter direction, and a second inner wall surface 4c facing the outward diameter direction.

The lower surface 91a of the lower end portion 91 is faced to the bottom surface 4a of the groove portion 4 in the up-down direction through the third space C. The first side face 91b of the lower end portion 91 faces the first inner wall surface 4b of the groove portion 4 in the diameter direction through the fourth space D. The second side surface 91c of the lower end portion 91 is faced the second inner wall surface 4c of the groove portion 4 in the diameter direction through the fifth space E. The third to fifth spaces C, D and E are filled with an adhesive AD. That is, the groove portion 4 is filled with the adhesive AD.

The first side surface 91b of the lower end portion 91 and the first inner wall surface 4b of the groove portion 4 are separated in a horizontal direction at a first horizontal distance (distance) d1. Also, the second side surface 91c of the lower end portion 91 and the second inner wall surface 4c of the groove portion 4 are separated in the horizontal direction at the second horizontal distance (distance) d2. The first horizontal distance (distance) d1 is equal to the second horizontal distance (distance) d2. That is, the dimension along the diameter direction of the fourth space D is the same as the dimension along the diameter direction of the fifth space E.

The outer flange portion 94 is located on the upper side of the lower end portion 91. The outer flange portion 94 extends to the outward diameter direction from the upper end of the lower end portion 91. The outer flange portion 94 has a lower surface 94b. The lower surface 94b is a surface facing downward. The outer flange portion 94 is faced the sealing surface 3a in the up-down direction through the first space A on the lower surface 94b. The first space A is filled with an adhesive AD.

The lower surface 94b of the outer flange portion 94 has a horizontal portion 94c and an inclined portion 94d. The horizontal portion 94c extends to the outward diameter direction from the upper end of the lower end portion 91 along a direction (X-axis direction) orthogonal to the axial direction. The inclined portion 94d is located on the outer side in the diameter direction of the horizontal portion 94c and is inclined upward toward the outward diameter direction.

The outer flange portion 94 is spaced apart from the sealing surface 3a in the diameter direction outer end 94a in the up-down direction at a first vertical distance (distance) h1. Also, the outer flange portion 94 is spaced apart from the sealing surface 3a at a second vertical distance (distance) h2 in up-down direction at a portion of the inward diameter direction. The first vertical distance h1 is larger than the second vertical distance h2.

The inner flange portion 96 is located on the upper side of the lower end portion 91. The inner flange portion 96 extends to the inward diameter direction from the upper end of the lower end portion 91. In the present example embodiment, the inner flange portion 96 extends to the outward diameter direction from the lower end of the cylinder body 98a. That is, the inner flange portion 96 is located closer the outward diameter direction than the lower end portion of the cylinder body 98a. However, the positional relationship along the diameter direction of the lower end portion of the cylinder body 98a, the diameter direction of the inner flange portion 96, and the diameter direction of the outer flange portion 94 is not limited to the present example embodiment. As an example, the inner flange portion 96 may extend to the inward diameter direction from the lower end of the cylinder body 98a. In the present example embodiment, the position of the inner flange portion 96 in the up-and-down direction coincides with the position of the outer flange portion 94 in the up-and-down direction. However, the inner flange portion 96 and the outer flange portion 94 may be formed at different positions in the up-down direction.

The inner flange portion 96 has a lower surface 96b. The lower surface 96b is a surface facing lower side. The inner flange portion 96 is faced the sealing surface 3a in the up-down direction through the second space B at the lower surface 96b. The second space B is filled with an adhesive AD.

The lower surface 96b of the inner flange portion 96 has a horizontal portion 96c and an inclined portion 96d. The horizontal portion 96c extends to inward diameter direction from the upper end of the lower end portion 91 along a direction (X-axis direction) orthogonal to the axial direction. The inclined portion 96d is located to the inward diameter direction of the horizontal portion 96c and is inclined upward toward the inward diameter direction.

The inner flange portion 96 is spaced apart from the sealing surface 3a in the diameter direction inner end 96a in the up-down direction at a third vertical distance (distance) h3. Further, the inner flange portion 96 is spaced apart from the sealing surface 3a in the up-down direction at a fourth vertical distance (distance) h4 at a portion of the outward diameter direction. The third vertical distance h3 is larger than the fourth vertical distance h4.

Also, the horizontal portions 94c of the outer flange portion 94 and the horizontal portions 96c of the inner flange portion 96 may be omitted. Also, a surface inclined to the side opposite to the inclined direction of the inclined portions 94d, 96d may be formed at a portion corresponding to the horizontal portions 94c, 96c.

Next, the process for bonding and fixing the motor body 3 and the cover 90 will be described. First, the inside of the groove portion 4 of the motor main body 3 is filled with an uncured adhesive AD. Subsequently, the lower end portion 91 is inserted into the groove portion 4 with the cover 90 closer to the motor body 3 from above. As a result, the uncured adhesive AD overflows from the opening of the groove portion 4. As a result, the adhesive AD flows into the space between the outer flange portion 94 and the inner flange portion 96 and the sealing surface 3a (i.e., the first space A and the second space B), and the first space A and the second space B are filled with the adhesive AD. Then, the adhesive AD is cured. The motor body 3 and the cover 90 are adhered and fixed by the above process.

According to the present example embodiment, the outer flange portion 94 faces the sealing surface 3a through the first space A filled with the adhesive AD. The adhesive AD is exposed toward the outward diameter direction. Therefore, when a moisture-curing type adhesive is used as the adhesive AD, the curing time of the adhesive AD can be shortened. Further, the moisture-curing type adhesive reacts with the moisture in the air on the surface portion exposed to the air and slowly cures from the surface toward the deep portion. By using a moisture-curing type adhesive as the adhesive AD, it is possible to carry out the next process at the time when the exposed portion of the first space A is cured in the assembly line of the motor 1. According to the present example embodiment, the waiting time for curing the adhesive AD in the process can be remarkably shortened.

According to the present example embodiment, the distance between the outer flange portion 94 and the sealing surface 3a is increased toward the outward diameter direction in the inclined portion 94d of the lower surface 94b of the outer flange portion 94. Therefore, it is possible to secure a wide exposed portion toward the outside in the diameter direction of the adhesive AD filled in the first space A. As a result, the area of the adhesive AD exposed to the air can be secured to be wide, and the curing of the adhesive can be promoted. This effect is an effect that can be expected also for the adhesive AD between the inner flange portion 96 and the sealing surface 3a (the second space B).

According to the present example embodiment, in the first space A, the adhesive AD is exposed toward the outside in the diameter direction. Therefore, it can be confirmed that the filled state and the cured state of the adhesive AD in the first space A from the external appearance. Therefore, it is easy to secure the quality of the product in the production line.

According to the present example embodiment, the first space A is wider in the axial direction in the vicinity of the radially outer end 94a of the outer flange portion 94, and more adhesive AD can be collected toward the outward diameter direction. Therefore, even when the filled amount of the adhesive AD is scattered, the adhesive AD can be collected in the first space A from the lower side of the inclined portion 94d. As a result, it is possible to prevent the adhesive AD from being pushed the outward diameter direction from the diameter outer end 94a of the outer flange portion 94. Further, it is possible to provide the motor 1 with high appearance designability.

According to the present example embodiment, the second space B is wider in the axial direction in the vicinity of the diameter inner end 96a of the inner flange portion 96, and more adhesive AD can be collected toward the inward diameter direction. Therefore, even when the filled amount of the adhesive AD is scattered, the adhesive AD can be collected in the second space B from the lower side of the inclined portion 96d. As a result, it is possible to prevent the adhesive AD from being pushed out the inward diameter direction from the diameter inner end 96a of the inner flange portion 96. Further, in the inside of the cover 90, adhesion of the adhesive AD to electronic components can be suppressed, and the motor 1 with improved reliability can be provided.

According to the present example embodiment, the inner flange portion 96 faces the sealing surface 3a through the second space B filled with the adhesive AD. That is, the cover 90 is adhered and fixed to the sealing surface 3a of the motor main body 3 in the inner flange portion 96 as well as the outer flange portion 94. As a result, the bonding area between the cover 90 and the motor main body 3 can be ensured to be wide, and the bonding strength can be increased.

According to the present example embodiment, the first space A and the second space B extending in the up-down direction are formed between the outer flange portion 94 and the inner flange portion 96 and the sealing surface 3a. Further, between the lower surface 91a of the lower end portion 91 and the bottom surface 4a of the groove portion 4, the third space C extending in the up-down direction is formed. That is, the motor main body 3 and the cover 90 do not directly contact with each other in the up-down direction. Therefore, the motor body 3 and the cover 90 can be brought into contact with each other at other portions, and positioning in the up-down direction can be performed at the other portions. More specifically, as shown in FIG. 3, the support member 52 is sandwiched between the motor body 3 and the cover 90 in the up-down direction, so that the relative positioning of the motor body 3 and the cover 90 in the up-down direction can be determined. Therefore, by increasing the accuracy of the up-down dimension of another member (the support member 52 in the present example embodiment) that is easy to manage the dimension, the positional deviation of the cover 90 with respect to the motor body 3 in the up-down direction can be suppressed.

According to the present example embodiment, as shown in FIG. 2, the groove portion 4 is formed in an annular shape extending along the circumferential direction and surrounding the central axis J. Therefore, fixing the motor main body 3 and the cover 90 by filling the groove portion 4 with the adhesive AD, the inside of the groove portion 4 can be reliably sealed, and the waterproof performance and the dustproof performance of the motor 1 can be enhanced. In addition, since the adhesive AD can be uniformly provided along the circumferential direction, the motor main body 3 and the cover 90 can be fixed to each other with a stable bonding strength against stress from each direction.

According to the present example embodiment, the third space C, the fourth space D, and the fifth space E are formed between the outer surface of the lower end portion 91 and the inner surface of the groove portion 4. And, the third space C, the fourth space D, and the fifth space E are filled with an adhesive AD. As a result, the contact area between the lower end portion 91 and the groove portion 4 is increased, and the cover 90 and the motor main body 3 can be firmly fixed.

It is assumed that the stress is applied to the motor body 3 and the cover 90 in directions opposite to each other. In this case, the adhesive AD filling the third space C is given a peeling force in the normal direction of the bottom surface 4a and the lower surface 91a. On the other hand, a peeling force in the front end direction is given in the fourth space D and the fifth space E. Generally, the adhesive has strong peeling force with respect to the normal direction of the surface. According to the present example embodiment, since the third space filled with the adhesive AD is formed between the lower surface 91a of the lower end portion 91 and the bottom surface 4a of the groove portion 4, the motor main body 3 and the cover 90 can be firmly adhered have.

It is assumed that stresses in diameter directions in opposite to each other are applied to the motor main body 3 and the cover 90. In this case, a peeling force in the tensile direction is applied to one of the adhesive AD filled in the fourth space D and the fifth space E, and a compressive force is applied to the other. The adhesive AD may be peeled off from the peeling force in the tensile direction, but is not peeled off from the compressive force. According to the present example embodiment, the adhesive AD is filled in the fourth space D and the fifth space E through the lower end portion 91, whereby the motor main body 3 and the cover 90 can be firmly adhered to each other to the stress in the diameter direction.

According to the present example embodiment, since the first horizontal distance d1 and the second horizontal distance d2 are the same, the thickness of the adhesive AD in the diameter direction can be made uniform, and the adhesive strength to the stress from each direction can be stabilized. According to the present example embodiment, the first horizontal distance d1 of the fourth space D is equal to the second horizontal distance d2 of the fifth space E. The state of the adhesive AD flowing in the fourth space D and the fifth space E can be brought close to each other when the lower end portion 91 is inserted into the groove portion 4 filled with the uncured adhesive AD. The amount of the adhesive AD overflowing from the opening of the groove portion 4 can be made substantially equal in the inward and outward diameter direction. As a result, the amount of the adhesive AD between the outer flange portion 94 and the sealing surface 3a (the first space A), and the amount of the adhesive AD between the inner flange portion 96 and the sealing surface 3a (the second space B) can be made substantially equal. Further, the adhesive AD can be sufficiently spread over both the first space A and the second space B, and stable fixing can be achieved.

The first inner wall surface 4b and the second inner wall surface 4c of the groove portion 4 are inclined in directions away from each other toward the opening side from the bottom surface 4a. That is, the groove portion 4 is enlarged as the dimension along the diameter direction is directed toward the upper side. According to the example embodiment, when the lower end portion 91 is inserted into the groove portion 4 filled with the uncured adhesive AD, the adhesive AD can smoothly flow along the first inner wall surface 4b and the second inner wall surface 4c of the groove portion 4. As a result, the adhesive AD can be sufficiently spread over both the first space A and the second space B, and stable fixing can be achieved. In the present example embodiment, the first horizontal distance d1 and the second horizontal distance d2 are substantially the same distance along the axial direction. However, if the first horizontal distance d1 and the second horizontal distance d2 are not equal along the axial direction, the above-described effect can be achieved if the first horizontal distance d1 and the second horizontal distance d2 are the same at the same position in the up-down direction.

Figure 6:
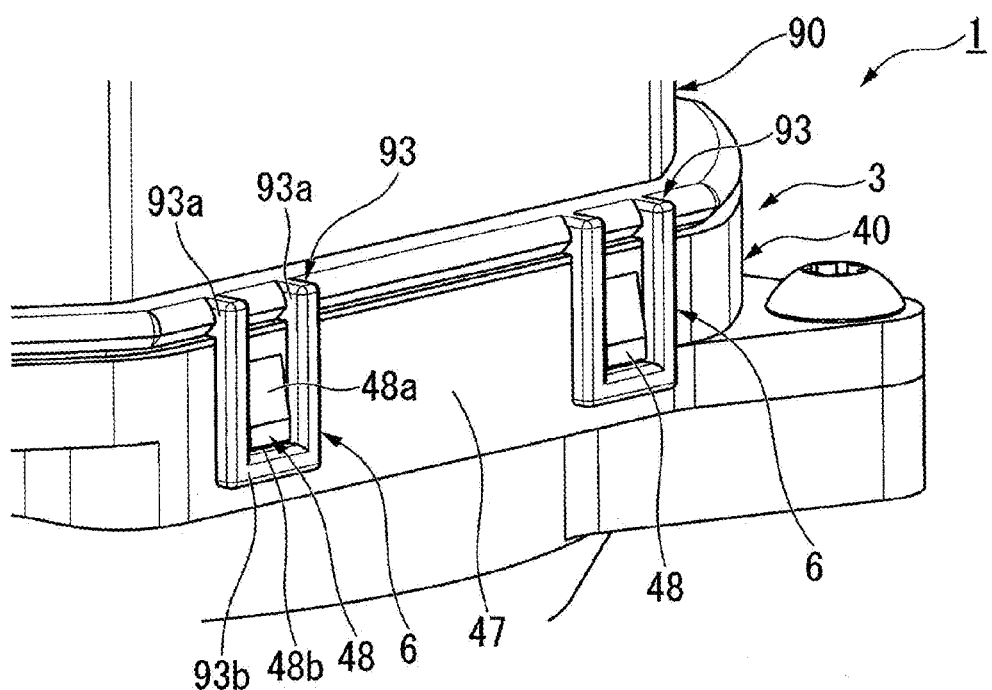
FIG. 6 is an external view of a boundary portion between a motor main body and a cover in a motor of one example embodiment of the present disclosure.

FIG. 6 is an external view of the motor 1 at the boundary between the motor main body 3 and the cover 90. The motor main body 3 and the cover 90 are fixed to each other by a plurality of snap pit units 6. A plurality of snap pit units 6 are provided in the motor 1 along the circumferential direction.

The snap pit unit 6 includes a locking portion 93 provided on the cover 90 and a claw portion 48 provided on the motor main body 3. The locking portion 93 of the cover 90 has a pair of extending portions 93a extending to the outward diameter direction from the outer flange portion 94, and a U-shaped portion 93b extending the lower side from an end portion in a diameter direction side of the pair of extending portions 93a. The claw portion 48 is located on the outer circumferential surface 47 extending from the sealing surface 3a in the bearing holder 40 of the motor main body 3. The claw portion 48 protrudes the outward diameter direction from the outer circumferential surface 47. The claw portion 48 has an upper inclined surface 48a and a locking surface 48b located below the upper inclined surface 48a. The upper inclined surface 48a inclines toward the outward diameter direction along downward. The locking surface 48b is a flat surface facing downward.

In the assembly process, as the cover 90 is approached the motor body 3 along the axial direction by the operator, the U-shaped portion 93b is moved to until the lower side of the locking surface 48b of the claw portion 48. As a result, the locking portion 93 is locked with the claw portion 48. The snap fit unit 6 restrains the cover 90 to move upward in the motor main body 3, and fixes the motor main body 3 and the cover 90 together. The snap pit unit 6 is provided to hold the cover 90 to the motor main body 3 until the cover 90 is mounted on the motor main body 3 and the adhesive AD hardens.

Figure 7:
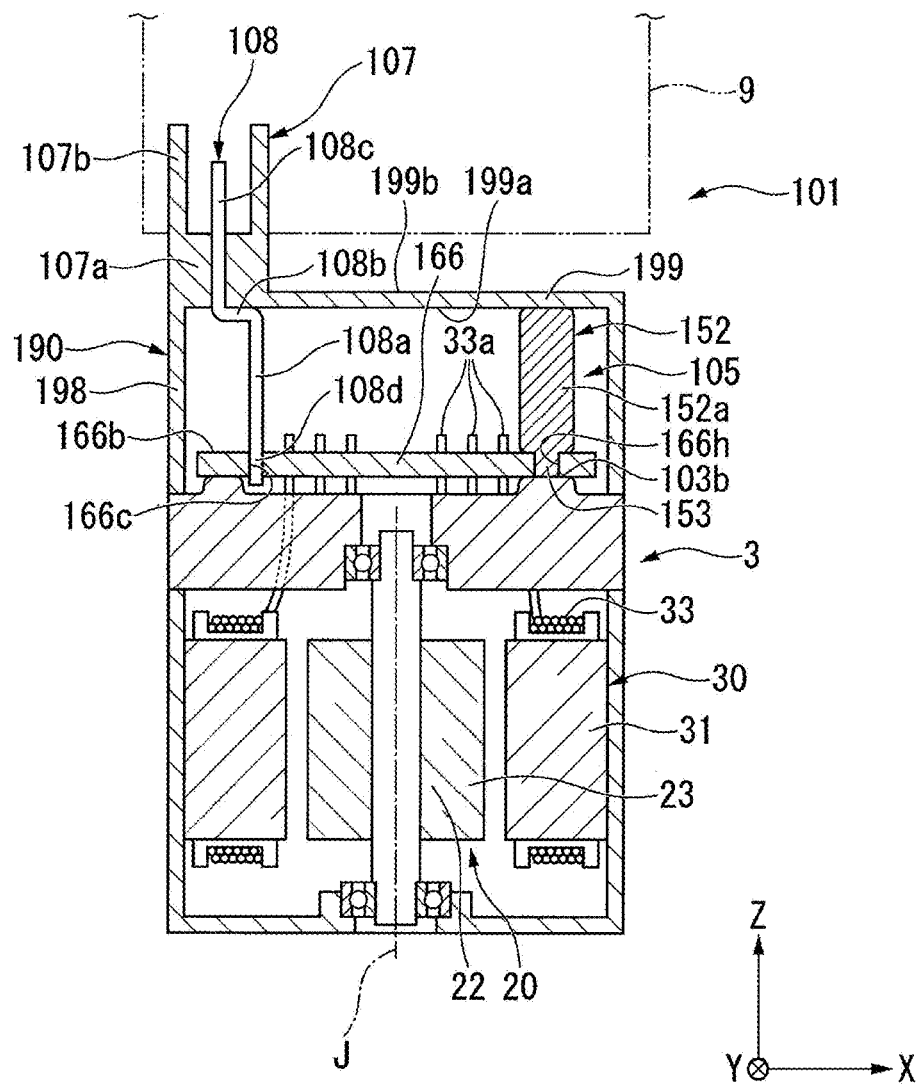
FIG. 7 is a cross-sectional view of a modified example of an example embodiment of the present disclosure through a motor center axis.

FIG. 7 is a schematic cross sectional view of a motor 101 according to a modified example of the above described example embodiment. The same reference numerals as in the above described example embodiments denote the same elements, and a description thereof will be omitted.

The motor 101 of this modification example includes a motor main body 3, a control unit 105 located on the upper side of the motor main body 3, and a cover 190 surrounding the control unit 105 from the outward diameter direction and the upper side.

The cover 190 is located on the upper side (+Z side) of the motor main body 3. The cover 190 has a cylindrical shape that opens to the lower side (−Z side). The cover 190 accommodates the control unit 105. The lower opening of the cover 190 is covered by the motor main body 3.

The cover 190 has a cylindrical portion 198, a bottom portion 199, and a connector holder portion 107. The cylindrical portion 198 surrounds the control portion 105 from the outward diameter direction. The bottom portion 199 covers the upper opening of the cylindrical portion 198.

The connector holder portion 107 is connected to the bottom portion 199. The connector holder portion 107 has a connector holding portion 107a extending upward from an upper surface 199b of the bottom portion 199 and a connector case portion 107b located above the connector holding portion 107a. The connector holding portion 107a holds a connector portion 108. The connector case portion 107b surrounds the periphery of the connector portion 108 to protect the connector portion 108.

The control unit 105 controls the rotation of the rotor 20 of the motor main body 3. The control unit 105 has a substrate 166, a connector portion 108, and a support member 152.

The substrate 166 is disposed along a direction orthogonal to the center axis J. The substrate 166 is connected to the end portion of a coil wire 33a drawn out from a stator 30. A through hole 166h through which the protrusion 153 of the support member 152 passes and a hole 166c through which a press fitting pin 108a of the connector portion 108 is inserted are formed in the substrate 166. The through hole 166h and the hole 166c penetrate the substrate 166 in the up-down direction.

The connector portion 108 is provided to connect the control circuit configured on the substrate 166 to the external device 9. The connector portion 108 is made of a conductive metal material. The connector portion 108 has the press fitting pin 108a, a bent portion 108b, and an external connection terminal 108c. That is, the control unit 105 has the press fitting pin 108a.

The press fitting pin 108a extends along the up-down direction. The lower distal end portion 108d of the press fitting pin 108a is press fitted into the hole 166c formed in the substrate 166 from an upper surface 166b of the substrate 166. Thereby, the press fitting pin 108a is electrically connected to the substrate 166. That is, the press fitting pin 108a is inserted into the hole 166c formed in the substrate 166 and electrically conducted.

The external connection terminal 108c extends along the up-down direction. A portion near the lower side of the external connection terminal 108c is embedded in the connector holding portion 107a of the cover 190. A portion of the external connection terminal 108c above the portion embedded in the connector holding portion 107a protrudes an outside of the cover 190. That is, the external connection terminal 108c is partially embedded in the connector holding portion 107a, and protrudes to the outside of the cover 190. The connector portion 108 is connected to the external device 9 at a distal end of the external connection terminal 108c. In this modification, the external connection terminal 108c extends along the upper side with respect to the motor main body 3 and is connected to the external device 9 located on the upper side of the motor 1. However, a direction in which the external connection terminal 108c extends is not limited to this modification example. For example, a configuration that extends in a direction orthogonal to the central axis J of the motor body 3 and is connected to the external device 9 located on a lateral side of the motor 1.

The bent portion 108b connects an upper end of the press fitting pin 108a and a lower end of the external connection terminal 108c. As shown in FIG. 7, the press fitting pin 108a and the external connection terminal 108c are disposed to be shifted in a direction orthogonal to the axial direction (in this modification example, the diameter direction). Therefore, the bent portion 108b extends along a direction orthogonal to the axial direction. In addition, the bent portion 108b extends along a lower surface 190a of the cover 190. The bent portion 108b is faced and in contact with the lower surface 190a of the cover 190 in the up-down direction. Thereby, a stress at a time of press fitting the press fitting pin 108a into the substrate 166 can transfer to the lower surface 190a of the cover 190. Therefore, the press fitting pin 108a can be easily press fitted into the substrate 166 by moving the cover 190 downward with respect to the motor main body 3 in a state in which the connector portion 108 is mounted on the cover 190 by insert molding or the like.

The support member 152 has a support member main body portion 152a and a protrusion 153. The support member main body portion 152a is located between a lower surface 199a of the bottom portion 199 and the upper surface 166b of the substrate 166 facing the lower side of the cover 190. The support member main body portion 152a contacts the upper surface 166b of the substrate 166 at the lower end surface. The support member main body portion 152a contacts the lower surface 199a of the cover 190 on the upper end surface. The protrusion 153 passes through the through hole 166h formed in the substrate 166. The protrusion 153 contacts an upper surface 103b which is the surface facing the upper side of the motor main body 3.

According to this modification example, the connector portion 108 has the press fitting pin 108a which is press fitted into the substrate 166. Therefore, it is not necessary to use solder or the like for electrical connection between the connector portion 108 and the substrate 166, and the assembling process can be simplified.

According to this modified example, the support member 152 is fitted and in contact with the bottom 199 of the cover 190 and the motor body 3. Therefore, by precisely managing the dimension in the up-down direction of the support member 152, it is possible to improve the positional accuracy of the cover 190 with respect to the motor body 3 in the up-down direction. Further, thereby, it is possible to suppress the deviation of the press fitting depth of the press fitting pin 108a. In this modification example, the connector portion 108 is formed integrally with the cover 190. However, the connector portion 108 and the cover 190 are separate.

Figure 8:
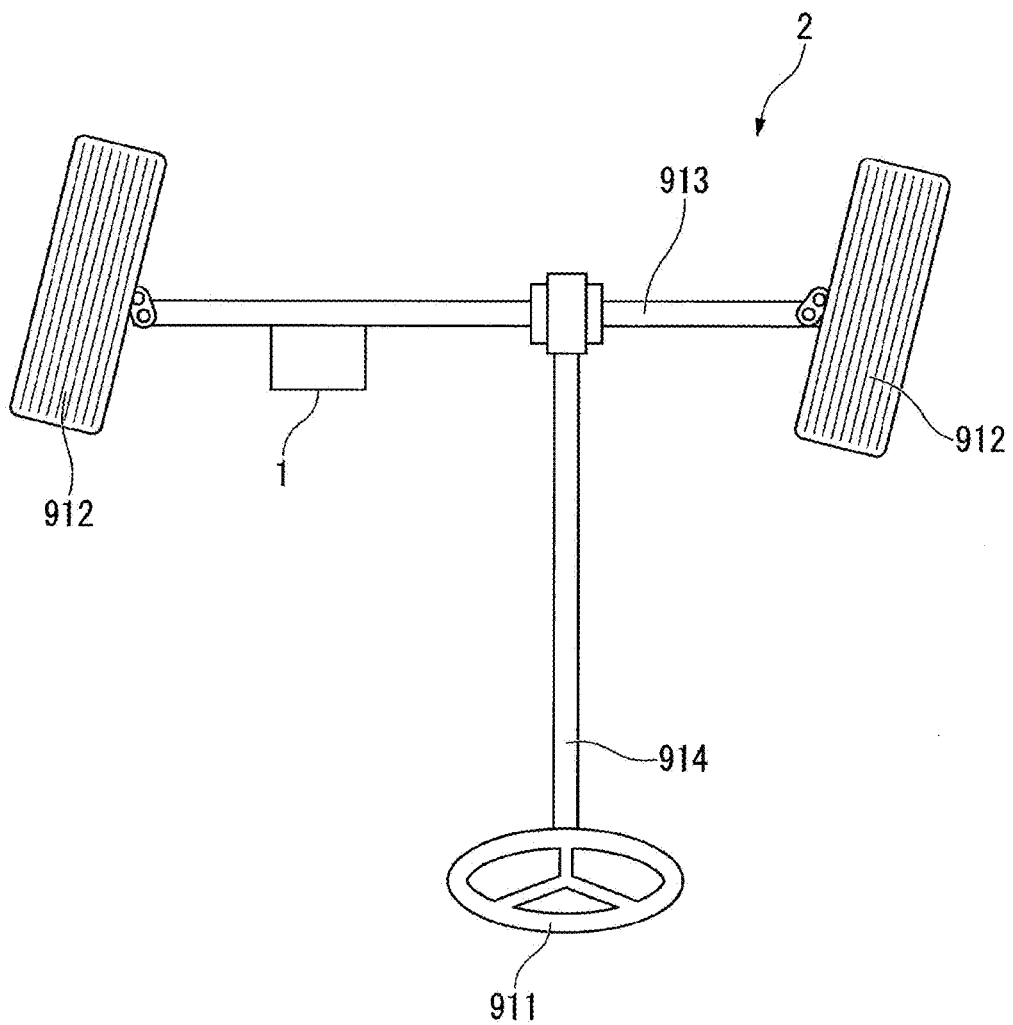
FIG. 8 is a schematic diagram showing an electric power steering apparatus according to an example embodiment of the present disclosure.

Next, an example embodiment of an apparatus for mounting the motor 1 (or the motor 101 of the modification example) of the present example embodiment will be described. In the present example embodiment, an example in which the motor 1 is mounted on an electric power steering apparatus will be described. FIG. 8 is a schematic diagram showing the electric power steering apparatus 2 of the present example embodiment.

The electric power steering apparatus 2 is mounted on a steering mechanism of a wheel of an automobile. The electric power steering apparatus 2 of the present example embodiment is a rack type power steering apparatus that directly reduces a steering force by the power of the motor 1. The electric power steering apparatus 2 includes a motor 1, a steering shaft 914, and an axle 913.

The steering shaft 914 transfers an input from the steering 911 to the axle 913 having a wheel 912. The power of the motor 1 is transmitted to the axle 913 through a ball screw (not shown). Since the motor 1 employed in the power steering apparatus 2 of the rack type is attached to the axle 913 and is exposed to the outside, a waterproof structure is required.

The electric power steering apparatus 2 of the present example embodiment includes the motor 1 of the present example embodiment. Therefore, the electric power steering apparatus 2 having the same effect as that of the present example embodiment is obtained. Here, the power steering apparatus 2 is exemplified as an example of a method of using the motor 1 of the present example embodiment, but the method of using the motor 1 is not limited.

While the present disclosure has been described with reference to the example embodiment, it is to be understood that the present disclosure is not limited to the details of the example embodiment, and other modifications are possible. Further, the present disclosure is not limited to the example embodiments.

In the above described example embodiments, the press fitting terminal for connecting the boards to each other are referred to as "press fitting pin". However, the terminal to be employed is not limited to the name of "press fitting pin" as far as it is a press fitting terminal provided with a press fitting mechanism for connection with the substrate, and any substitutable terminal may be used. For example, one distal end may be connected by press fitting, and the other distal end may be connected by welding or soldering.

Further, in the above described example embodiment, the press fitting pin and the support member for supporting the press fitting pin may be integrally formed. For example, a support member formed by molding a press fitting pin with a resin may be employed.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor comprising:
a motor main body including a rotor rotatable about a central axis extending in an up- down direction;
a controller to control rotation of the rotor and disposed on an upper side of the motor main body; and
a cover surrounding the controller from an outward diameter direction and an upper side of the controller; wherein
the controller includes:
substrates disposed along a direction perpendicular or substantially perpendicular to the central axis and connected with a coil wire extending from a stator,
a press fitting pin electrically connected to the substrates and extending along the up-down direction, and
a support contacting a first contact surface on the upper side of the motor main body and a second contact surface on a lower side of the cover;
the substrates are stacked with one another in the up-down direction;
two ends of the press fitting pin are inserted into holes and electrically connected to the substrates,
the support retains the press fitting pin.

2. The motor according to claim 1, wherein
the substrates include a first substrate contacting an upper surface of the motor main body, and a second substrate located at an upper side of the first substrate and contacting a lower surface of the cover;
the first and second substrates are provided with through holes penetrating in the up-down direction;
the support is located between the first and second substrates in the up-down direction; and
the support includes a first protrusion that is in contact with the first contact surface through the through hole of the first substrate, and a second protrusion that is in contact with the second contact surface through the through hole of the second substrate.

3. The motor according to claim 1, wherein
the controller includes a pair of the supports; and the pair of support are respectively located on an end portion of one side of the substrates and an end portion of another side of the substrates, when seen in a plan view.

4. The motor according to claim 1, wherein the upper surface of the motor main body and a lower end portion of the cover are sealed.

5. The motor according to claim 4, wherein a groove portion opened upward is provided on a surface facing the cover;

the lower end portion of the cover is inserted in the groove portion; and an adhesive is filled in an inside of the groove portion.

6. The motor according to claim 4, wherein the motor main body and the cover face each other through a space; and the space is filled with an adhesive.

\* \* \* \* \*